(12) United States Patent  
Astigarraga et al.

(10) Patent No.: US 8,988,245 B2  
(45) Date of Patent: Mar. 24, 2015

(54) CABLE MANAGEMENT DISPLAY

(71) Applicant: International Business Machines Corporation, Armonk, NY (US)

(72) Inventors: Tara Astigarraga, Fairport, NY (US); Louie A. Dickens, Tucson, AZ (US); Nancy V. Ryson, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/946,748

(22) Filed: Jul. 19, 2013

(65) Prior Publication Data

US 2013/0300753 A1    Nov. 14, 2013

Related U.S. Application Data

(63) Continuation of application No. 12/859,528, filed on Aug. 19, 2010, now Pat. No. 8,493,228.

(51) Int. Cl.
```
G08B 7/00      (2006.01)
G09G 5/00      (2006.01)
H04Q 1/02      (2006.01)
```
(52) U.S. Cl.
CPC ............... *G09G 5/003* (2013.01); *H04Q 1/136* (2013.01)

USPC ........ 340/691.6; 340/653; 340/654; 340/657; 439/488; 439/489; 439/490; 439/502

(58) Field of Classification Search
CPC ............................... G09G 5/003; H04Q 1/136
USPC ............... 340/691.6, 653, 654, 657; 439/488, 439/489, 490, 502
See application file for complete search history.

(56) References Cited

U.S. PATENT DOCUMENTS

| | | | |
|---|---|---|---|
| 5,225,816 A | 7/1993 | Lebby et al. | |
| 6,917,349 B2 | 7/2005 | McGowan et al. | |
| 6,979,223 B2 | 12/2005 | Chen | |
| 7,118,407 B2 | 10/2006 | Ching | |
| 7,334,731 B1 * | 2/2008 | McLean | 235/443 |
| 7,591,670 B2 | 9/2009 | Chen et al. | |
| 7,648,387 B2 | 1/2010 | Wurth et al. | |
| 7,677,921 B2 | 3/2010 | Czarnecki | |
| 2005/0260884 A1 | 11/2005 | Yueh | |

\* cited by examiner

*Primary Examiner* — Tai T Nguyen  
(74) *Attorney, Agent, or Firm* — Kunzler Law Group

(57) ABSTRACT

For cable management, a bi-stable liquid crystal display is positioned on an exterior segment of a communications cable. A display module that connects to the bi-stable liquid crystal display, connects to the communications cable with one or more pins, and receives the signal associated with one or more messages about the communications cable. The display module further causes the one or more messages to be shown on the bi-stable liquid crystal display in response to the display module receiving the signal.

17 Claims, 6 Drawing Sheets

CABLE MANAGEMENT DISPLAY

The is a continuation application of and claims priority to U.S. Pat. No. 8,493,228, originally application Ser. No. 12,859,528, entitled "Cable Management Display" and filed on Aug. 19, 2010 for Tara Astigarraga et al., which is incorporated herein by reference.

FIELD

The subject matter disclosed herein relates to communications cables and more particularly relates to providing a display on communications cables to aid in cable management.

BACKGROUND

Description of the Related Art

Cable management can be a notoriously difficult problem in data centers and other installations that use large amounts of cable to connect computers and computing devices. For example, a storage area network (SAN) may have communications cables such as Ethernet cables, Fibre Channel cables, and others that connect the various components of the SAN. In a large data center, the tangle of communications cables can become so complex that the resulting hugger-mugger is often referred to as a bird's nests. It can be extremely difficult to determine what a particular communications cable connects to, or to follow its length from one connection to the other. This presents problems when trying to service or manage the data center.

BRIEF SUMMARY

A communications cable has been developed in response to the present state of the art, and in particular, in response to the problems and needs in the art that have not yet been fully solved by currently available cable management systems. Accordingly, the applicants have developed an improved cable management product.

A messaging apparatus for a communications cable includes a bi-stable liquid crystal display (such as a ferroelectric liquid crystal display, or FLCD) that is configured to be positioned on an exterior segment of the communications cable. For example, the messaging apparatus may be part of a connector for the communications cable, such as an 8P8C connector. A display module connects to the bi-stable liquid crystal display. The display module receives a signal associated with one or more messages about the communications cable and causes the messages to be shown on the bi-stable liquid crystal display when the display module receives the signal. The message may include characters, numbers, and colors.

The signal may be sent to the to the display module over the communications cable, with the signal being generated by a signal generation module. The signal generation module may be part of a computing device (such as a switch) connected to the communications cable, or may be realized in a hand-held driver. The display module may be connected to pins of the communications cable to enable it to receive signals. The display module may, for example, be connected to a ground pin, a signal pin, a horizontal position pin, and a vertical position pin of the connector. The messaging apparatus may, in certain embodiments, use low pass filters and/or high pass filters to separate signals intended for the display module and those signals intended for computing devices communicating over the communications cable.

The signal may include a set signal, a horizontal location signal, and a vertical location signal to indicate which pixel to target and what action should be taken (for example, lighten or darken) at that pixel. The signal may include one or more pulses. Once the signal is complete, a message will be displayed on the bi-stable liquid crystal display.

The cable management approach disclosed herein may be realized as part of a system. The system may include a communications cable with a first messaging apparatus and a second messaging apparatus. These messaging apparatus may be built into the connectors for the communications cable and attached to each end of the communications cable. The system may also include signal generation modules that send signals to the messaging apparatuses. As noted above, these signal generation modules may be located in the computing devices that communicate over the communications cable or may be located in hand held drivers.

The cable management approach may involve a method. The method may involve connecting a display to an exterior segment of a communications cable and connecting the display module to the display and to the pins of the communications cable. The method may also involve configuring the signal generation module to send a signal to the display module, and configuring the display module to show a message on the display in response to receiving the signal.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
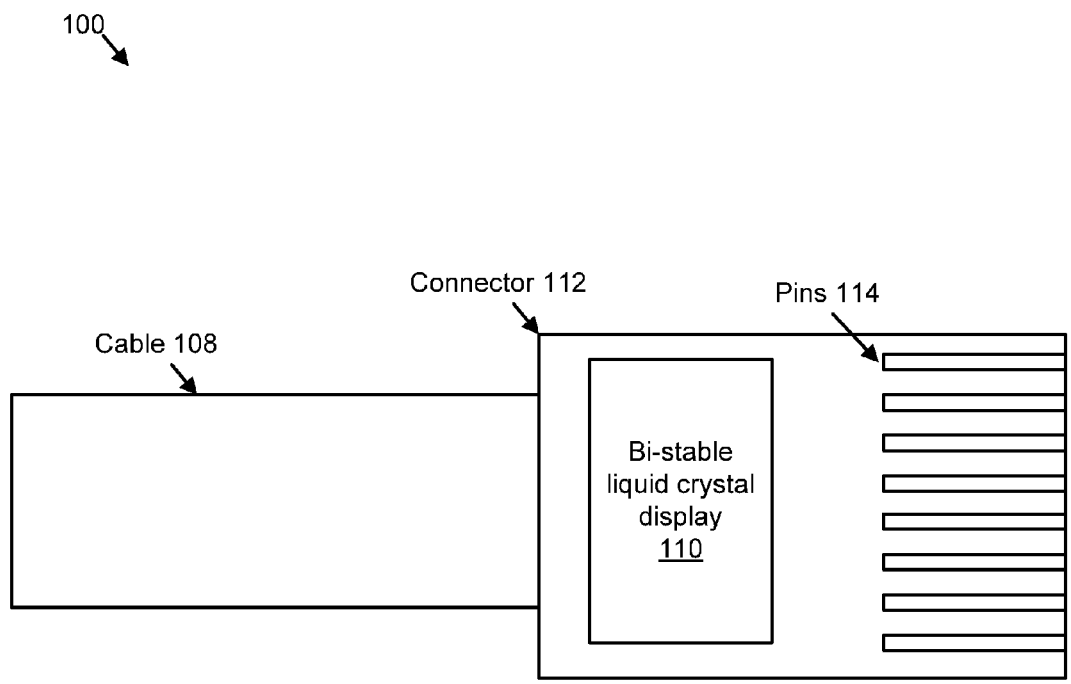
FIG. 1 is a schematic block diagram illustrating one embodiment of a communications cable with a display.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a communications cable 100 comprising a cable 108, connector 112, a bi-stable liquid crystal display 110, and pins 114. The communications cable 100 may be any variety of cable system capable of transmitting a signal to an electronic device. Examples include, but are not limited to, coaxial cable, multicore cable, twisted pair cable, fiber-optic cable, and others. The communications cable 100 may be an Ethernet cable, SCSI cable, Fibre Channel cable, USB cable, or other variety of cable. The communications cable 100 may be used to support a variety of communications, such as Fibre Channel (FC), Fibre Channel over Ethernet (FCoE), and others. The communications cable 100 may be, for example, Category 7 cable. The communications cable 100 generally includes a cable 108 with a connector 112 on each end of the cable 108. The connector 112 makes a connection between the cable 108 and the computer to which the communications cable 100 attaches. The communications cable 100 may be used to connect to a SAN switch, a storage peripheral, a printer, a client, a server, or other electronic device. The connector 112 allows the computer to interface with the cable 108 and send information over it.

The connector 112 may be, for example, an 8 position 8 contact (8P8C) (also commonly referred to as RJ45) connector commonly used to terminate twisted pair and multi-conductor communications cable 100. The connector 112 includes pins 114 that allow connected computers, SAN switches, storage peripherals, printers, clients, servers, or other electronic devices, to send information over the cable 108.

The communications cable 100 may also include a bi-stable liquid crystal display 110 (also commonly referred to as zero power displays). The bi-stable liquid crystal display may be a ferroelectric liquid crystal display (FLCD), a zenithal bi-stable devices (ZBD), a polymer stabilized cholesteric liquid crystals (ChLCD) display, or other appropriate display. The bi-stable liquid crystal display is made using material that can present an image and maintain an image even in the absence of power.

For example, the molecules in FLCDs snap to one orientation or another depending on an applied voltage. The result is a light or dark section. The molecules maintain their orientation even after the applied voltage is removed. Thus, power is necessary to set the orientation (and thereby set the image on the FLCD), but power is not necessary to maintain that image. The bi-stable liquid crystal display 110 may have 10×10 pixels, 20×20 pixels, or another appropriate number of pixels.

The bi-stable liquid crystal display 110 is configured to be positioned on an exterior segment of the communications cable 100. In one embodiment, the bi-stable liquid crystal display 110 is located on the connector 112. The bi-stable liquid crystal display 110 may be built into the connector 112. The bi-stable liquid crystal display 110 may also be a separate component that connects to the connector 112 or the cable 108.

In one embodiment, the bi-stable liquid crystal display 110 is an FLCD created using an Indium Tin Oxide (ITD) coated polyethersulphone film as a substrate. ITO electrodes are then structured and a polyamide is deposited on the substrate using a flexographic printing process. A roller may be used to orientate the direction of the FLC molecules. Transparent etched spacers of 0.8 microns may then be deposited. Polarizers are added to give a final thickness of approximately 0.5 mm. This may result in a bi-stable liquid crystal display 110 that is stable over human handling pressure and that works over a temperature range of −20 degrees Celsius to 70 degrees Celsius. Other approaches may be used to create a bi-stable liquid crystal display 110. In addition, the approaches are dependent upon the particular bi-stable liquid crystal display 110 technology being implemented.

FIG. 1 shows only one connector 112 with one bi-stable liquid crystal display 110. In many embodiments, the communications cable 100 will have two ends, both of which terminate with a connector 112 and bi-stable liquid crystal display 110.

In certain embodiments, the bi-stable liquid crystal display 110 displays messages about the communications cable. The message may include characters, numbers, colors, or some combination of them. The message may be descriptive. The message may be an arbitrary code which a user can look up to determine what the message means. For example, if the bi-stable liquid crystal display 110 can display only two characters, a two character message may be presented. A user can then look up that two character message (for example, in a message book) to determine what the message means. Below is an exemplary table of possible messages that are codes and associated meanings.

TABLE 1

| Message | Message Meaning |
| --- | --- |
| 00 | No change to bi-stable liquid crystal display |
| 01 | Make entire bi-stable liquid crystal display dark |
| 02 | Make entire bi-stable liquid crystal display light |
| 03 | Optical Cable |
| 04 | Copper Cable |
| 05 | Cable fully functional |
| 06 | Cable degraded, error prone |
| 07 | Cable completely non-functional, end of life |
| 08 | Untested cable |
| 09 | Cable has worldwide cable name (WWCN) of _____ |
| 0A | Attach this end of cable to worldwide port number _____ |
| 0B | Unique barcode for inventory purposes |
| 0C | Usage statistics: % attaches used _____ |
| 0D | Vital product data is _____ |
| 0E | Warranty period has expired |
| 0F | 50 micron optical cable |
| 10 | 62.5 micron optical cable |
| 11 | Crossover cable |
| 12 | Straight-through cable |
| 13 | Length of cable is _____ |
| 14 | DICOM compliant cable |
| 15 | SCSI cable |
| 16 | USB cable |

The above are simply representative of the sorts of messages that may be displayed on the bi-stable liquid crystal display 110. Other messages are also possible. One embodiment is where the worldwide cable name, and/or the messages in Table 1, are stored as either a 1-dimensional or 2-dimensional barcode on a bi-stable liquid crystal display 110. In yet another embodiment, non-English characters such as Chinese Kanji are displayed on the bi-stable liquid crystal display 110. And, as noted above, depending on the limitations of the bi-stable liquid crystal display 110 that is used, the full message (as opposed to a message that is a reference code) may be displayed on the bi-stable liquid crystal display 110.

Figure 2:
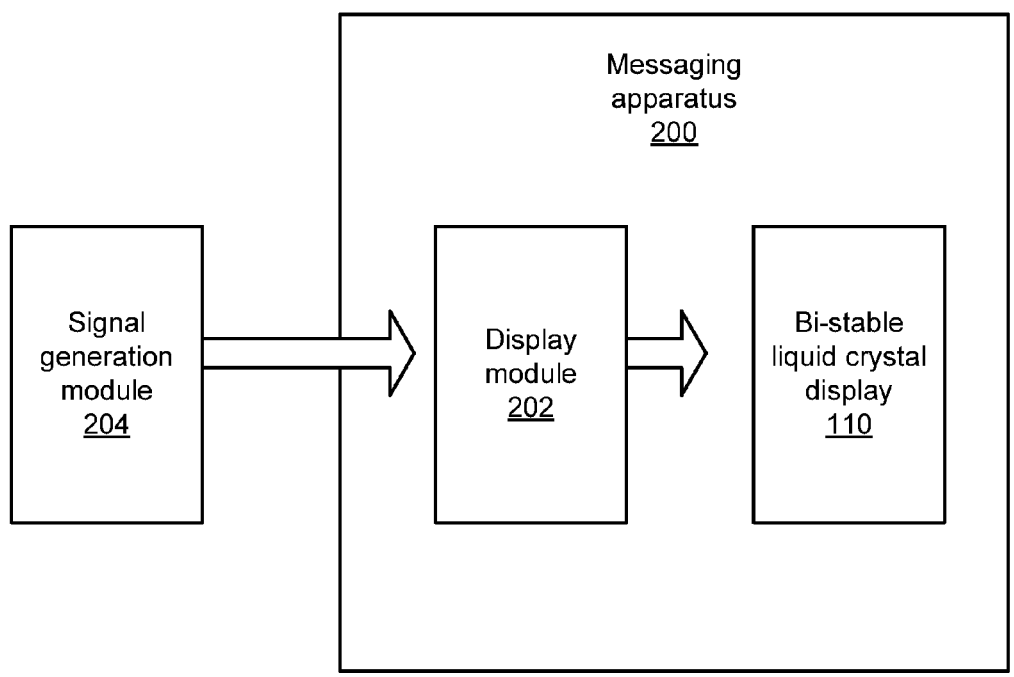
FIG. 2 is a schematic block diagram illustrating one embodiment of a messaging apparatus.

FIG. 2 shows one embodiment of a messaging apparatus 200 including a display module 202 and a bi-stable liquid crystal display 110. The messaging apparatus 200 may also include a signal generation module 204. In certain embodiments, the signal generation module 204 may be physically implemented in a separate physical device.

The messaging apparatus 200 allows messages to be displayed and changed on the bi-stable liquid crystal display 110. The messaging apparatus 200 may be implemented in a connector 112, may be a physically separate device that connects to the communications cable 100, or some combination thereof. The display module 202 may, in certain embodiments, connect to the pins 114 of the connector 112. Examples of possible connection schemes are presented below. In the depicted embodiment, the signal generation module 204 is separate from the messaging apparatus 200.

The display module 202 connects to the bi-stable liquid crystal display 110. The display module 202 receives a signal associated that is associated with one or more messages about the communications cable 110. The display module 202 causes one or more messages to be shown on the bi-stable liquid crystal display 110 in response to receiving the signal. The signal may actually be made up of various signals. For example, the signal may include a set signal. A set signal, as used in this application, tells which pixels to darken and/or lighten on the bi-stable liquid crystal display 110. The set signal may be a square wave with amplitude ranging between +5 Volts and −5 Volts. The signal may also include a horizontal location signal (indicating the horizontal location of the pixel that is the subject of the set signal) and a vertical location signal (indicating the vertical location of the pixel that is the subject of the set signal). Thus, the signal may (for example) include a first pulse with a set signal, horizontal location signal, and vertical location signal. The first pulse may set a first pixel. The signal may include a second pulse that sets a second pixel, and so on, until the message is properly displayed on the bi-stable liquid crystal display 110. The signal completes with the last pulse. In certain embodiments, the various different signals described above that make up the overall signal may be sent in parallel operations. In other embodiments, the various signals may be sent serially.

A signal generation module 204 generates a signal to be sent to the display module 202. The signal generation module 204 may be part of a hand held driver that is used to change the display. In one embodiment, the hand held driver is attached to the connector 112 of the communications cable 100 and sends a signal to the display module 202 using a physical connection. In another embodiment, the hand held driver sends the signal to the display module 202 wirelessly. The hand held driver may allow a user to enter the message to be displayed on the bi-stable liquid crystal display 110. The hand held driver may allow a user to select a particular message meaning (such as the examples shown in table 1) and use the signal generation module 214 to send a signal that causes a message that is a code (such as the examples shown in table 1) to be displayed on the bi-stable liquid crystal display 110.

In certain embodiments, the signal generation module 204 is part of a computing device that connects to the communications cable 100. For example, the signal generation module 204 may be part of a switch. In such embodiments, the computing device may be configured to cause the signal generation module 204 to send an appropriate signal in response to a particular event without user intervention. For example, if the computing device determines that errors are being generated during transmission over the communications cable 100, the computing device may automatically and autonomously cause the signal generation module 204 to send a signal associated with a message alerting the user to possible problems with the communications cable 100. In certain embodiments, a user may cause the computing device to send a particular signal. The computing device may have a special driver port used to send the signal, or the computing device may be configured to use any port to send the signal.

In one embodiment, the computing device is an end-to-end cable tester. In such embodiments, the end-to-end cable tester may cause the signal generation module 204 to send a signal causing the display module 202 to display a message including values such as the signal to noise ratio (SNR), resistance, and other relevant values.

Figure 3:
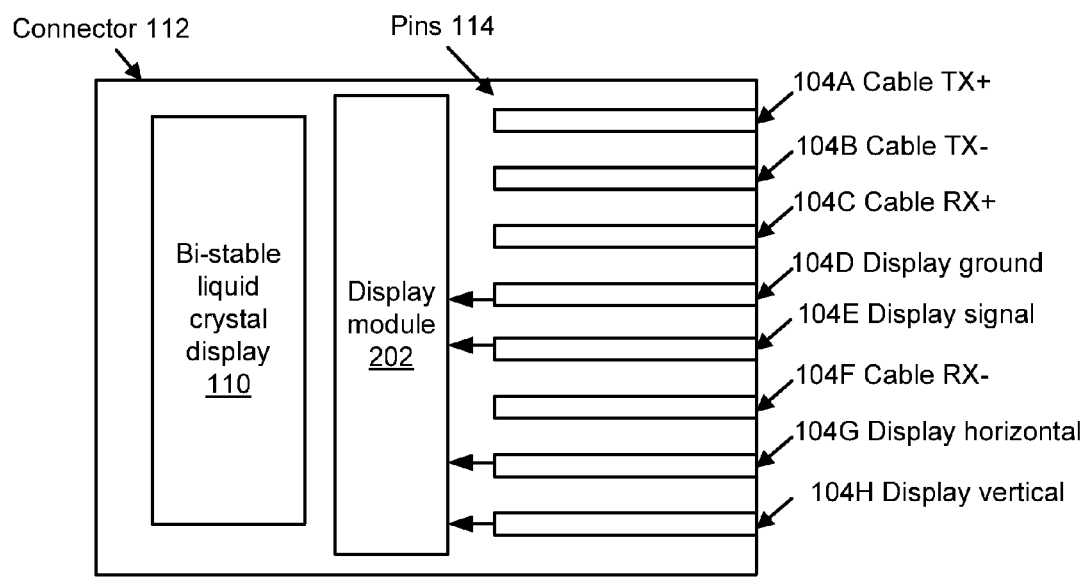
FIG. 3 is a schematic block diagram illustrating one embodiment of connector for a communications cable having a display.

FIG. 3 shows one embodiment of a connector 112 with a bi-stable liquid crystal display 110 and a display module 202. The display module 202 may connect to particular pins 114 to enable the display module 202 to receive signals for setting the message on the bi-stable liquid crystal display 110. Certain pins 114 may be used exclusively for sending and receiving data on the communications cable 100, while other pins 114 may be used exclusively for sending signals to the display module 202. The display module 202 may connect to unused pins 114 in a connector 112 for a communications cable 100 supporting Ethernet. In other embodiments, the display module 202 may connect to pins 114 used to transmit standard data over the communications cable 100.

For example, an 8 P8C connector 112 may use only four of its eight pins 114 for Ethernet communications. As shown as an example in FIG. 3, pins 104A-C and 104F may be used for transmitting and receiving data. In such an embodiment, pins 104D-E and 1-4G-H may be used to send signals to the display module 202. In other embodiments, the signal generation module 204 (whether part of a hand held driver, computing device, or other) connects to the display module 202 using a connection that is separate from those provided in a standard connector 112. For example, an optical cable may require that dedicated pins 114 be built in to support communicating with the display module 202.

Figure 4:
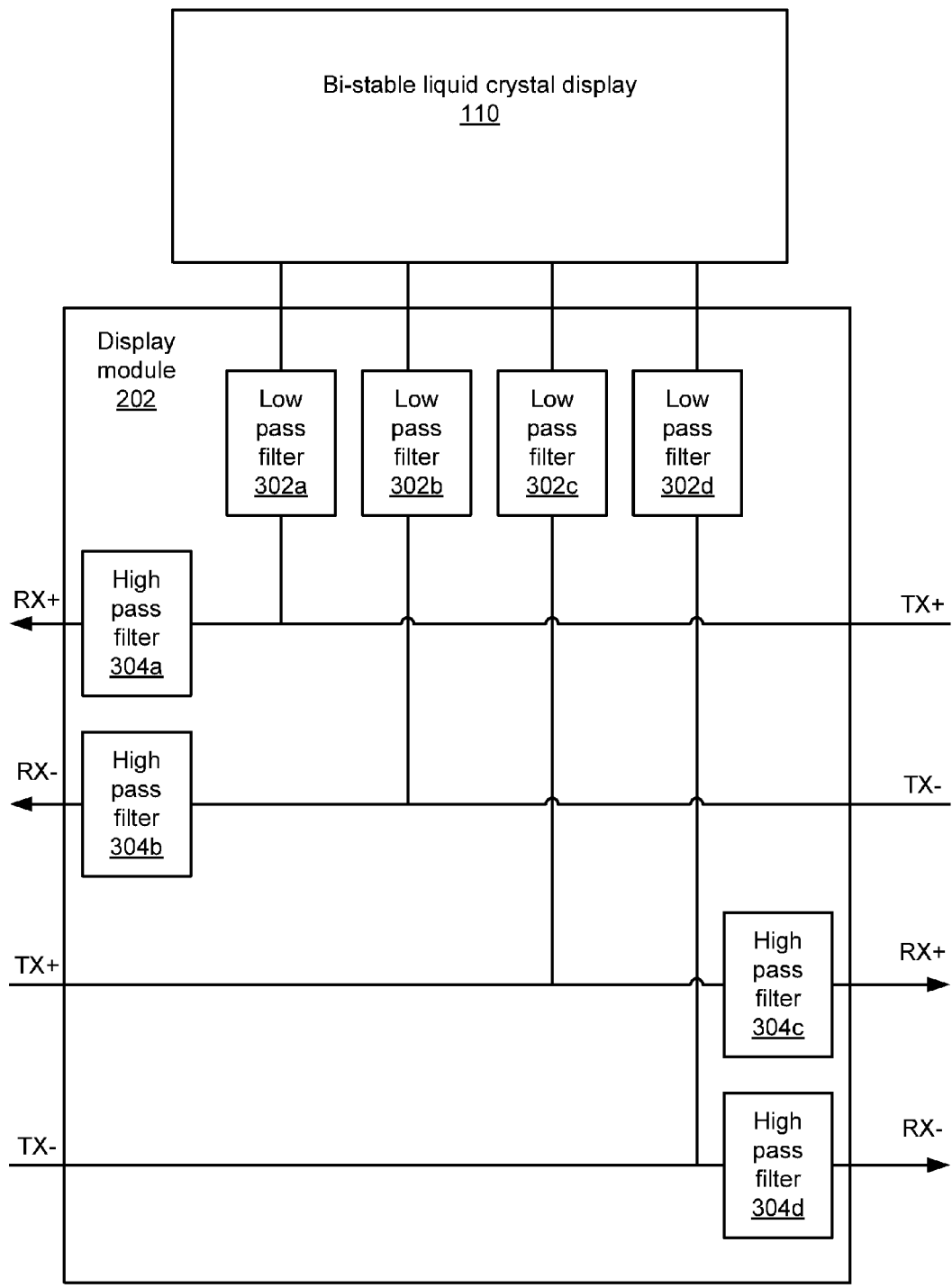
FIG. 4 is a schematic block diagram illustrating one embodiment of a display module in communication with a display and a communications cable.

FIG. 4 displays one embodiment of a display module 202 that includes low pass filters 302a-d and high pass filters 304a-d. The display module 202 may contain more of fewer components than those shown in FIG. 4. The display module 202 shown in FIG. 4 may use lines in the communications cable (such as the RX+, RX−, TX+, and TX− lines) that are used to transmit data and use these lines to receive signals indicating what to display on the bi-stable liquid crystal display 110. In one embodiment, the display module 202 contains low pass filters 302a-d. The low pass filters 302a-d may be used to prevent 1-10 GB/s information from being transmitted to the bi-stable liquid crystal display 110 and unintentionally changing the bi-stable liquid crystal display 110. In such embodiments, low frequencies are used by the signal generation module 204 to send the signal to the display module 202. For example, a frequency of 50 kb/s to 1 Mb/s or slower may be used by the signal generation module 204. Such a frequency may be sufficiently lower than the frequency for standard data to allow the low pass filters 302a-d to distinguish between signals intended for the bi-stable liquid crystal display 110 and those intended for computing devices using the communications cable 100. The low frequency signals are received by the display module 202, pass through the low pass filters 302a-d, and result in a message being displayed on the bi-stable liquid crystal display 110.

The display module 202 may also include high pass filters 304a-d. The high pass filters 304a-d may be used to prevent signals intended to set the bi-stable liquid crystal display 110 from being transmitted over the communications cable 100 to a computing device on the other end of the communications cable 100. The low pass filters 302a-d and high pass filters 304a-d may be resistor-capacitor (RC) filters, Butterworth filters, or other appropriate filters.

In certain embodiments, the display module 202 may include only low pass filters 302a-d. In such embodiments, the signals to set the bi-stable liquid crystal display 110 may be sent only when the receiving ports are logged off or otherwise offline. Thus, all signals to set the bi-stable liquid crystal display 110 would be ignored by the receiving port. Such an embodiment may still require low pass filters 302a-d to prevent the high frequency data travelling over the communications cable 100 during operation from unintentionally changing the bi-stable liquid crystal display 110.

Figure 5:
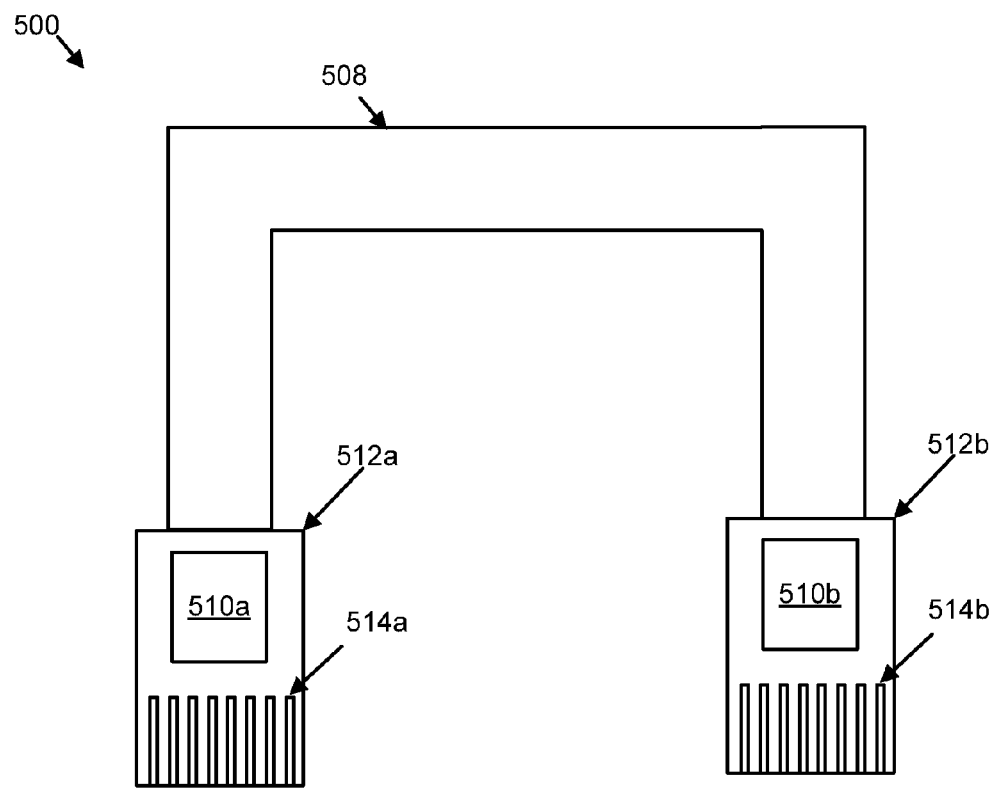
FIG. 5 is a schematic block diagram illustrating one embodiment of communications cable with displays on each terminated end.

FIG. 5 shows one embodiment of a communications cable 500 with a cable 508 terminating in a first connector 512a and a second connector 512b. Each connector 512a-b may include a messaging apparatus 200 as shown in FIG. 2 that includes a bi-stable liquid crystal display 510a-b and a display module 202. Each bi-stable liquid crystal display 510a-b may have its own display module 202. The bi-stable liquid crystal display 510a-b may be FLCDs that shown one or more messages about the communications cable 500. Thus, the first connector 512a may have an associated first messaging apparatus 200 and the second connector 512b may have an associated second messaging apparatus 200. Each bi-stable liquid crystal display 510a-b may attach to a display module 202 that receives a signal associated with a message about the communications cable 500. The display module 202 may cause the message about the communications cable 500 to display on the bi-stable liquid crystal display 510a-b that is attached to the display module 202 that receives the signal. The signal may be sent by a signal generation module 204 located in a hand held driver, a computing device (such as a SAN switch) or other device.

In certain embodiments, the first messaging apparatus and the second messaging apparatus coordinate to ensure that the messages displayed on their respective bi-stable liquid crystal displays 510a-b are the same. In other embodiments, different messages may be displayed on the bi-stable liquid crystal displays 510a-b.

The messaging apparatus may be configured such that the bi-stable liquid crystal displays display messages providing information about where the other end of the communication cable 500 is connected. For example, the bi-stable liquid crystal display 510a may display a message about where the connector 510b is attached (or should be attached). Similarly, the connector 510b may display a message about where the connector 510a is attached (or should be attached). The message may include the hostname, port, switch name, blade number, port number, or other information.

Figure 6:
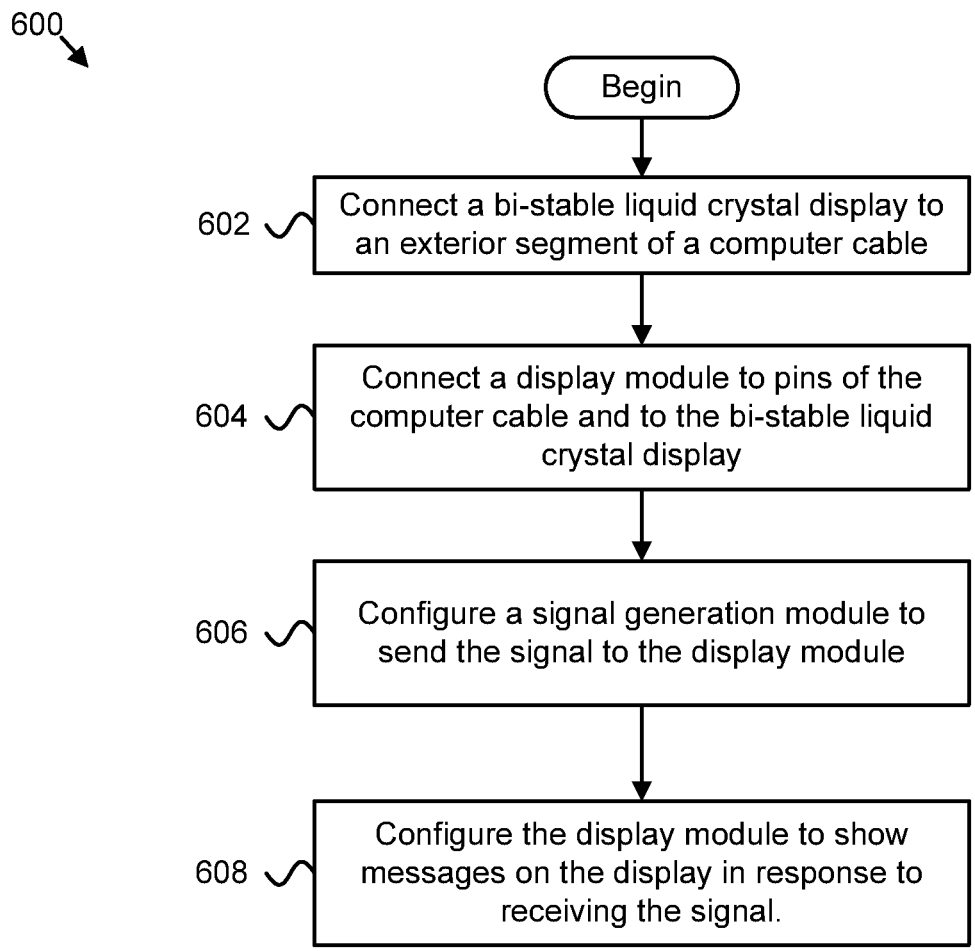
FIG. 6 is a flow chart diagram illustrating one embodiment of a method for configuring a communications cable with a display.

FIG. 6 shows one embodiment of a method 600 for communications cable management. The steps shown in the method 600 need not occur in any particular order. The method may begin with connecting 602 a bi-stable liquid crystal display 110 to an exterior segment of a communications cable, such as communications cable 100. In certain embodiments, this entails connecting the bi-stable liquid crystal display 110 to a connector 112 for the communications cable 100.

The method 600 may also involve connecting 604 a display module 202 to the pins 114 of the communications cable 100 and to the bi-stable liquid crystal display 110. The method 600 may also involve configuring 606 a signal generation module 204 to send a signal to the display module 202 and configuring 608 the display module 202 to show messages on the bi-stable liquid crystal display 110 in response to receiving the signal sent by the signal generation module 204.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A messaging apparatus comprising:
   a bi-stable liquid crystal display configured to be positioned on an exterior segment of a communications cable;
   a display module that connects to the bi-stable liquid crystal display, connects to the communications cable with one or more pins, and receives a, signal associated with one or more messages regarding the communications cable, wherein the signal comprises a set signal, a horizontal location signal, and a vertical location signal; and
   the display module showing the one or more messages on the bi-stable liquid crystal display in response to the display module receiving the signal.

2. The messaging apparatus of claim 1, wherein the messaging apparatus is part of a connector for the communications cable.

3. The messaging apparatus of claim 1, wherein the bi-stable liquid crystal display is selected from a group comprising a ferroelectric liquid crystal display (FLCD), a zenithal bi-stable device (ZBD), and a polymer stabilized cholesteric liquid crystals display (ChLCD).

4. The messaging apparatus of claim 1, wherein the message comprises one or more of characters, numbers, barcodes, and colors.

5. The messaging apparatus of claim 1, wherein the signal is sent to the display module over the communications cable, the signal generated by a signal generation module in a computing device connected to the communications cable.

6. The messaging apparatus of claim 1, wherein the signal is sent to the display module by a signal generation module in a hand-held driver.

7. The message apparatus of claim 1, wherein the display module connects to the communication cable through one or more low pass filters and one or more high pass filters separating a signal for the display module.

8. A system for cable management, the system comprising:
   a communications cable for communicatively connecting two or more computing devices;
   a first messaging apparatus connected to an exterior segment of the communications cable, the first messaging apparatus comprising:
     a bi-stable liquid crystal display configured to show messages;
     a display module that connects to the bi-stable liquid crystal display, connects to the communications cable with one or more pins, and receives a signal associated with a message regarding the communications cable, wherein the signal comprises a set signal, a horizontal location signal, and a vertical location signal;
     the display module showing the message regarding the communications cable on the bi-stable liquid crystal display in response to the display module receiving the signal; and
   a signal generation module configured to send the signal to the first messaging apparatus.

9. The system of claim 8, wherein the first messaging apparatus is part of a first connector for the communications cable.

10. The system of claim 9, further comprising a second messaging apparatus that is part of a second connector for the communications cable.

11. The system of claim 9, wherein the one or more pins comprise a ground pin, a signal pin, a horizontal position pin, and a vertical position pin of the connector.

12. The system of claim 8, wherein the display module connects to the communication cable through one or more low pass filters and one or more high pass filters separating a signal for the display module.

13. The system of claim 8, wherein the bi-stable liquid crystal display is chosen from a group comprising a ferroelectric liquid crystal display (FLCD), a zenithal bi-stable device (ZBD), and a polymer stabilized cholesteric liquid crystal display (ChLCD).

14. The system of claim 8, wherein the message comprises one or more of characters, numbers, barcodes, and colors.

15. A method for cable management, the method comprising:
   connecting a bi-stable liquid crystal display to an exterior segment of a communications cable;
   connecting a display module to the bi-stable liquid crystal display and to one or more pins of the communications cable;
   configuring a signal generation module to send a signal to the display module of the messaging apparatus, wherein the signal comprises a set signal, a horizontal location signal, and a vertical location signal; and
   configuring the display module to show the message on the bi-stable liquid crystal display in response to the display module receiving the signal.

16. The method of claim 15, wherein connecting the bi-stable liquid crystal display to the exterior segment of the communications cable comprises connecting the bi-stable liquid crystal display to a connector for the communications cable.

17. The method of claim 15, wherein the bi-stable liquid crystal display is chosen from a group comprising a ferroelectric liquid crystal display (FLCD), a zenithal bi-stable device (ZBD), and a polymer stabilized cholesteric liquid crystal display (ChLCD).

* * * * *